(12) United States Patent
Gaiski

(10) Patent No.: US 7,062,404 B1
(45) Date of Patent: Jun. 13, 2006

(54) METHOD FOR GENERATING COATING FILM BUILD USAGE AND COST IMPACT FROM $C_{PK}$'S

(76) Inventor: Stephen N. Gaiski, 43422 W. Oaks Dr., Suite 328, Novi, MI (US) 48377

( * ) Notice: Subject to any disclaimer, the term of this patent is extended or adjusted under 35 U.S.C. 154(b) by 148 days.

(21) Appl. No.: 10/784,095

(22) Filed: Feb. 23, 2004

Related U.S. Application Data

(62) Division of application No. 10/043,922, filed on Jan. 14, 2002, now Pat. No. 6,772,092.

(51) Int. Cl.
*G01B 17/02* (2006.01)

(52) U.S. Cl. .......................... 702/170; 702/97; 73/597; 73/598; 700/90; 324/230

(58) Field of Classification Search .................. 702/97, 702/170; 73/597, 598; 700/90, 109; 324/229, 324/230
See application file for complete search history.

(56) References Cited

U.S. PATENT DOCUMENTS

| 5,737,227 A | * | 4/1998 | Greenfield et al. | ......... 705/400 |
| 6,067,509 A | * | 5/2000 | Gaiski | ......... 702/170 |
| 6,772,092 B1 | * | 8/2004 | Gaiski | ......... 702/170 |

OTHER PUBLICATIONS

Breyfogle III, Forrest W., "Implementing Six Sigma", 1999, p. 160.
AIAG (Automotive Industry Action Group) Statistical Process Control (SPC) Reference Manual, p. 41.
AIAG Reference Manual, 1992, p. 42, 43, and 45.

* cited by examiner

*Primary Examiner*—Bryan Bui
(74) *Attorney, Agent, or Firm*—Charles W. Chandler

(57) ABSTRACT

A computer program for correlating coatings' material usage and cost impact with coatings ranges evaluated against an industry $C_{pk}$ standard. Optimum range values are selected from the process and/or coatings applicators' manufacturer guidelines.

16 Claims, 2 Drawing Sheets

METHOD FOR GENERATING COATING FILM BUILD USAGE AND COST IMPACT FROM $C_{PK}$'S

This application is a division of Ser. No. 10/043,922 filed on Jan. 14, 2002 Now U.S. Pat. No. 6,772,092.

FIELD OF THE INVENTION

Statistical process control charts track coating processes by plotting data over time. $C_{pk}$ is a statistical index that indicates whether a process will consistently produce coated units with a film having a thickness that is centered within tolerance limits. This invention relates to a novel computer-implemented process that anticipates the effect of $C_{pk}$ for optimizing coatings usage and costs by reducing variability in film build thickness. The process minimizes the environmental impact of volatile organic compounds from the overspray of finishes being applied to painted parts. Improved quality is achieved by analyzing obvious non-random patterns of film variability. The system uses software that refers to the Industry and/or World Class Standards for $C_{pk}$'s. Optimum film build range and average values selected from the process and/or the coating applicators' manufacturer guidelines are used for calculating the impact of changing coating thickness on all finished surfaces in terms of paint usage and costs.

BACKGROUND AND SUMMARY OF THE INVENTION

Manufacturers of painted products, such as automotive bodies and/or furniture companies, assess paint film build thickness by various measurement tools. These tools include the Elcometer, the Pelt Gage or a Wet Gage. These devices measure film build thickness at specific points on the painted unit. Data from these measurements are then downloaded into a commercially available software database. Numerous statistical process control (SPC) and trend charts are generated from this data. These control charts include $\overline{X}$ (average thickness vs. time); R charts (range of thickness vs. time) [APPENDIX A], and Individual Moving Range Charts [APPENDIX B]. Appendix A charts the film thickness average readings of a paint coating, taken Oct. 10, 2000 to Mar. 21, 2001, in millimeters. Appendix B charts the film build average values on automotive bodies taken Oct. 10, 2000 to Dec. 21, 2000.

Control limits are defined as a line (or lines) on a chart used for evaluating the stability of a process.

Typical control limits are plus or minus three standard deviation limits using at least 20 data points. When a point falls outside these limits, the process is said to be out of control.

Additionally, schematics of the painted unit [APPENDIX C] can be prepared which highlight or animate the painted surface areas' compliance with either material and/or engineering coating specifications.

Process engineers review these charts and make corrective changes to the automation equipment, and any manual application equipment applying the coating. Considerable expenditure is spent on paint automation equipment and manual spraying techniques to ensure that the highest quality finish is produced at the lowest possible cost. This cycle repeats itself daily in many coating industries. Engineering reviews SPC charts and/or trend charts, and then adjusts automation based on historical data.

A statistically controlled condition exists when all special causes of film thickness variations have been eliminated with only common causes remaining. A "common" cause is a source of variation that affects all the individual thickness values of the process. An SPC chart that is described as "in statistical control" possesses data values that neither surpass the control limits of the charts, nor possess non-random patterns or trends within the control limits.

Engineers refer to Process Capability indices ($C_p$ and $C_{pk}$) generated by the SPC charts to evaluate the total range of a process's inherent variation. $C_p$ is defined as a measurement of the allowable tolerance spread divided by the actual $6\sigma$ spread data. $C_{pk}$ has a similar ratio to $C_p$ but considers the shift of the mean film thickness relative to the central specification target.

Industry groups have set different control targets for what they consider capable processes. Raw data in software statistical control charts generate $C_p$ and $C_{pk}$ data. However, one manufacturer may consider the process in control when a $C_{pk}$ of 1.33 is obtained, while another may seek a $C_{pk}$ of 1.5. The Coating Applications Industry does not have a way to quickly identify the optimum statistical data from process data that will produce the given industry standard for a given $C_{pk}$ value. Control Charts currently are used only for tracking purposes rather than control purposes.

Previous attempts at controlling processes within the Coatings Application Industry with only SPC (Statistical Process Control) charts suffer from a number of disadvantages:

(a) Engineers cannot calculate the minimal material usage for each painted surface area by increasing the process $C_{pk}$'s using commercially available SPC charts.

(b) Engineers cannot calculate the cost savings that can be realized for each painted surface area by increasing the process $C_{pk}$'s using commercially available SPC charts.

(c) Engineers only use SPC Control Charts for tracking rather than controlling purposes.

They must wait for a preset number of entries within the database before generating $C_{pk}$, rather than selecting a lesser number of current values and quickly determining its impact on $C_{pk}$.

(d) Most plant personnel do not realize that they can increase quality to industry standards, yet realize no savings in raw material usage and costs.

(e) Manufacturing facilities typically employ numerous types of coating applications as well as different colors among coatings. Substantial engineering and labor time is allocated for each manufacturing facility to analyze SPC charts that originate from the following categories:
1. each surface area measured;
2. each painting booth within the plant;
3. each style of manufactured product that is produced;
4. each color group or individual color that is used on the painted product; and
5. specific time frames where process improvements or evaluations are being conducted.

(f) substantial coating waste occurs because non-random trends are only identified a substantial period after the coating is applied, thus requiring excessive coating reworks of the painted products.

Typically, a coatings engineer will review an SPC chart, but fail to note the impact that continuing what is noted only as a temporary optimum trend, will have on the process in terms of savings in material usage and costs.

Appendix B highlights this point. This is an actual example from a coating process. Factors causing optimum Range value numbers: 7 (October 31), 8 (October 31), 12 (November 20), 13 (November 23), 14(November 27) and 20 (December 21) are observed but not scrutinized. The respective range values are: 0.01, 0.02, 0.03, 0.04, 0.01 and 0.03. Current commercially available statistical software packages do not correlate the effect that continuing an optimum range will have on reducing coating material usage and costs. At this one surface area, over a two month period (October 10 through December 21), the process was able to produce six optimum ranges which average 0.023 mil. versus an overall range average of 0.21 mil. for the same time period. Range values of coating thickness differ from unit to unit close to a magnitude of ten.

Standard prior art operating procedures continue tracking the data until a shift in the process data warrants the calculation of new control limits. Calculating new control limits usually require justifying to management why new control limits are necessary. Factors that warrant the calculation of new control limits, that are normally considered using the prior art method, include:

1. Waiting for a trend of seven consecutive points moving in the same direction, either upward or downward which indicates a gradual change in the process.

2. Waiting for seven points above the central line which indicates that the center of the normal distribution has started upward.

3. Waiting for seven points below the central line which indicates that the center of the normal distribution has started downward. Source: AIAG (Automotive Industry Action Group) Statistical Process Control (SPC) Reference Manual: pg. 41.

However, what the coatings industry and commercially available SPC programs fail to take into account is the analysis of obvious nonrandom patterns that exist in the Range average charts, specifically, the repeatability and/or pattern of a minimum of two optimum ranges that exist within a sample size of twenty readings. Twenty readings are the minimum number of points required for analysis. (Source: Implementing Six Sigma, Smarter Solutions Using Statistical Methods, by Forrest W. Breyfojlee III, pg. 160)

The AIAG recommends analyzing obvious nonrandom patterns on Range Charts. They recognize the importance of analyzing even a single point, but only if it falls out of the control limits. (Source: AIAG Reference Manual, pg. 42, 43 and 45)

The AIAG and the Coatings Industry have not recognized, the material, cost and environmental benefits of analyzing two optimum ranges found within a sample size of twenty readings, and within control limits.

A software program that analyzes material and/or cost impact based on optimum process ranges would enable engineers to respond more, quickly to a detectable trend change. The response would include inserting the optimum achievable target range values into the program and comparing new control limits against industry and/or world class $C_{pk}$ standards. This allows them to justify to their management, the reasons for identifying the sources contributing to the six optimum ranges, identified in Appendix B. Data can then be used to control the process rather than only tracking the process.

Appendix D, highlights what such an opportunity would provide.

The following data is available from the SPC chart [Appendix B]:
1) Coating
2) Surface Area Measured
3) Booth
4) Coating Minimum Specification
5) Actual Average
6) Actual Range
7) Actual $C_{pk}$ The following data is available from plant operations:
1) Usage Per Unit
2) Coating Cost per Gallon
3) Coating Popularity
4) Measured Surface Area Percentage
5) Booth Flow Percentage
6) Annualized Painted Part Production Volume
7) Industry or World Class $C_{pk}$ Standard (Available from Reference Manuals)

The engineer inserts into the program data information from an ongoing process pertaining to the optimum process range of film thickness under a $1^{st}$ Premise, identified as Target Range. New coating average thickness, upper and lower control limits or thickness are calculated as well as the effect of the change on coating usage (gallons) and costs.

The engineer then inserts into the software program information from an ongoing process pertaining to the optimum range pertaining to the coatings applicators manufacturer guidelines under a $2^{nd}$ Premise, (below $1^{st}$ premise), identified as Target Range.

The term "premise" means selecting either a new target range, a new range reduction value or a new adjusted coating average.

New coating average, upper and lower control limits are calculated as well as the effect of the change on coating usage and costs.

The novel software program automatically calculates under a $3^{rd}$ Premise, the effect of maintaining the coating average constant but adjusting variability to the Industry or World Class Standard.

New upper and lower control limits are calculated together with their effect on coating usage (gallons) and costs.

Note this is an important premise. Since in each calculation, if the coating average remains constant, no reductions are obtained in material costs.

The novel process then automatically calculates under a $4^{th}$ Premise, the effect of adjusting the coating average to the Industry or World Class Standard, but maintaining variability constant.

For example, data reveals that with the first premise for one surface area, a 33.35% reduction in coating usage or $1,418.85 in cost savings could be obtained if the engineer replicates the conditions contributing to the optimum range. Note that this surface area represents 1.05% of one coating. Potentially, if this optimum range existed across the entire painted part, a cost savings of $135,059.05 would be realized. If the cost per gallon is $30.00, 4,502 gallons of coating would be saved. (Appendix D)

Another example of such waste is an industrial facility not realizing that several Coatings' Film Build $C_{pks}$ on certain parts of a painted surface have surpassed the Industry Standard. By not identifying the material and financial impact of this achievement, adjustments are not made to the other painted surface areas. The result is the continued acceptance of excess paint usage on this part, resulting in an annual additional expenditure of $764,654.00 instead of product savings of $49,232.00. Assuming a $28.00 cost per gallon, the facility consumed an unnecessary 27,309 gallons of paint using the current method of tracking process data. (Appendix G)

The known prior art fails to address the aforementioned problems. U.S. Pat. No. 5,737,227 to Greenfield et al.

describes a software-planning program for coatings but does not correlate the selection of an optimum range found within the process to $C_{pk}$'s. U.S. Pat. No. 6,067,509 to Gaiski describes a SPC software program from Pelt Gage Thickness Measurements but does not correlate the selection of an optimum range found within the process to $C_{pk}$'s impact on material usage and costs.

The objectives of the present invention are:
to provide an analytical tool for coating and painting facilities:
to reduce variability and improve quality with $C_{pk}$ Industry Standards and/or World Class Standards;
to generate the usage impact of materials based on the correlation between optimum film build range averages with $C_{pk}$ Industry Standards and/or World Class Standards;
to generate the cost impact of materials based on the correlation between optimum film build range averages with $C_{pk}$ Industry Standards and/or World Class Standards;
to generate the usage impact of materials by correlating the process variability remaining constant and adjusting the film build average to $C_{pk}$ Industry Standards and/or World Class Standards;
to generate the cost impact of materials by correlating the optimum film build range averages obtained from the manufacturing process with $C_{pk}$ Industry Standards and/or World Class Standards;
to generate the cost impact of materials by correlating the optimum film build range averages obtained from the coatings applicators' manufacturer guidelines with $C_{pk}$ Industry Standards and/or World Class Standards;
to generate the usage impact of materials by correlating the optimum film build range averages obtained from the manufacturing process with $C_{pk}$ Industry Standards and/or World Class Standards;
to generate the usage impact of materials by correlating the optimum film build range averages obtained from the coatings applicators' manufacturer guidelines with $C_{pk}$ Industry Standards and/or World Class Standards;
to generate the cost impact of materials by correlating the process variability remaining constant and the film build average adjusted to $C_{pk}$ Industry Standards and/or World Class Standards;
to minimize the amount of reworks by reducing variability in coating applications by correlating optimum film build range averages with $C_{pk}$ Industry Standards and/or World Class Standards;
to minimize the amount of paint sludge generated in coating applications by correlating optimum film build range averages with $C_{pk}$ Industry Standards and/or World Class Standards;
to minimize the amount of volatile organic compounds generated in coating applications by correlating optimum film build range averages with $C_{pk}$ Industry Standards and/or World Class Standards; and
to minimize the amount of labor required for cleaning paint overspray generated in coating applications by correlating optimum film build range averages with $C_{pk}$ Industry Standards and/or World Class Standards.

The novel program is used in paint departments to optimize paint usage, to reduce material costs, and to improve the quality of the painted part through variability reduction. Additionally, environmental benefits are achieved by reducing volatile organic compounds, which are directly related to paint usage. Landfill reduction is also achieved as less paint is consumed to generate paint sludge requiring disposal. Plant labor costs for cleaning paint overspray are also reduced.

This new statistical analysis links together a paint department's quality, financial and process analysis to yield both economic and environmental benefits. The analysis enables coating manufacturing applicators a way to accurately predict the costs and material savings associated with their equipment, using the coating range available with their equipment.

Accordingly, the objects and advantages of the present invention are to reduce material usage and costs by incorporating within a manufacturing facility, a means for generating Film Build $C_{pk}$'s Material and or Cost Impact Analysis sheets:
(a) from each surface area measured, thereby reducing material usage and costs;
(b) from each painting location measured;
(c) from each style of manufacturer product measured;
(d) from each color group or individual color measured;
(e) from each coating type measured;
(f) from specific time frames measured;
(g) on a timely measurement basis; and
(h) for each manufacturer of coating applicators based on their particular performance ranges.

SUMMARY

Using the preferred method, the Engineer reviews preferably 20 points on an X-Bar R chart. Each point may be the average of all the measurements of sample cars for a day.

The Engineer then selects two points with the lowest ranges from the 20 points. The values of the selected two points are then used to recalculate $C_{pk}$, $C_p$ etc.

This is a repeated process, that is, the Engineer reviews each new set of 20 points, takes the two points with the lowest range and repeats his calculation.

In some cases, it may be viable to recalculate $C_{pk}$ after each new set of a lesser number of points, as long as he considers the latest 20 points. He thus is continuously monitoring the process, and tightening up the tolerance levels by reducing the impact of obvious non-random causes of variability.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Step 100

Figure 1:
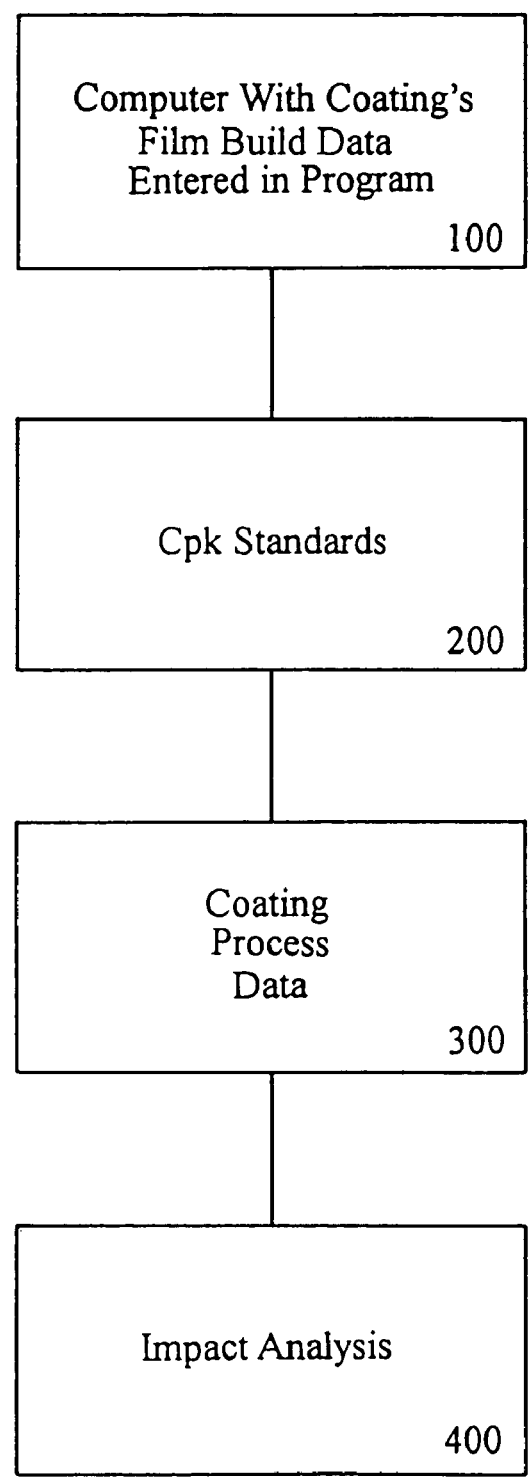
FIGS. 1 and 2 are block diagrams of a preferred embodiment of the present invention.
Figure 2:
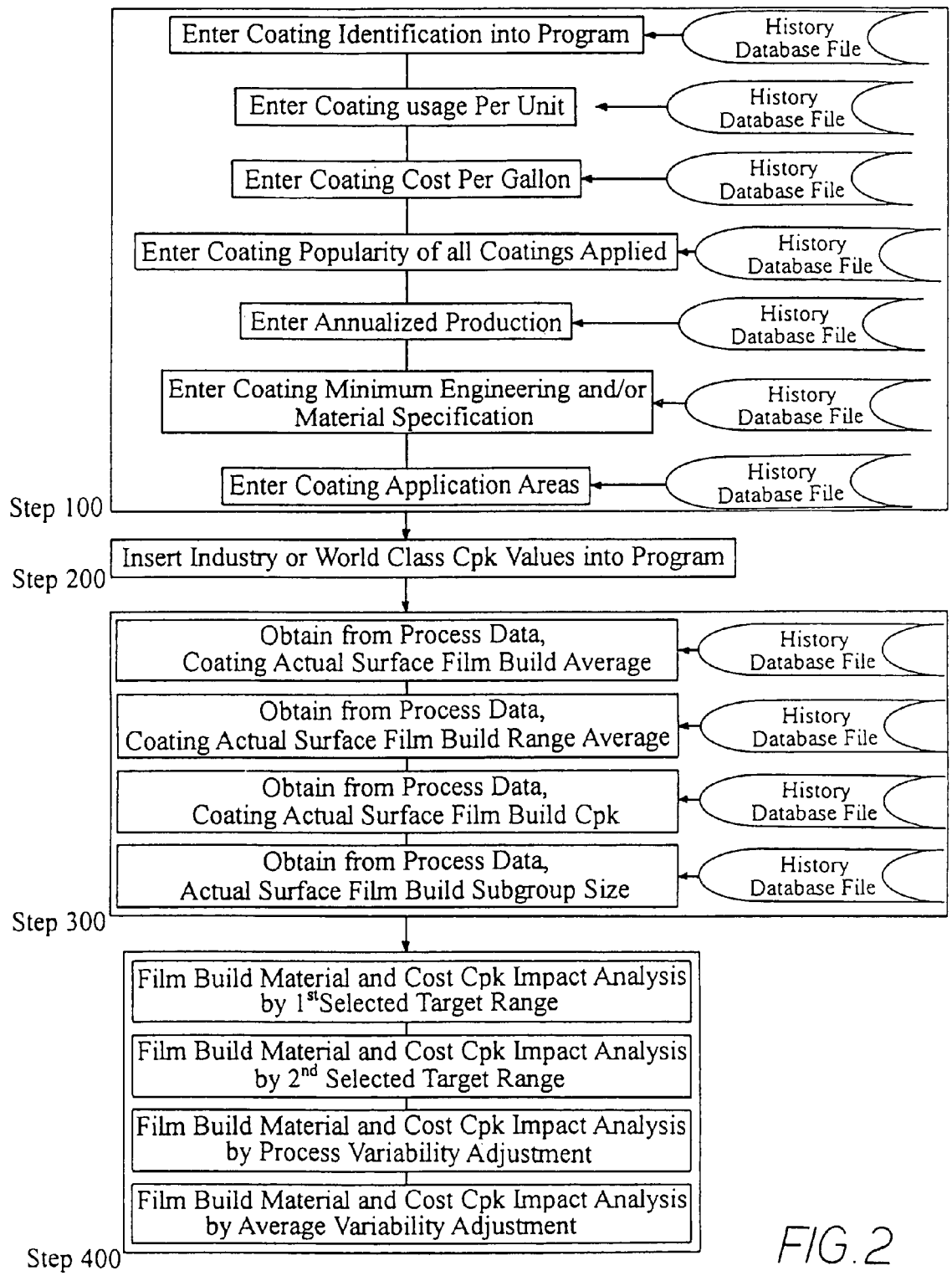

Referring to FIG. 1, a computer 100 with the novel program installed is used to collect data pertaining to the Coating Film Build. An entry field exists within the program for industry or world class $C_{pk}$ values. The program processes the coating process data and uses one of four or all four algorithms to calculate an Impact Analysis pertaining to the Coatings Material Usage and Cost Performance.

The user enters into the computer system the following data into a history database: the coating identification, the coating usage per unit, the coating cost per gallon, the coating popularity of all coatings, the annualized production, the coating minimum engineering and/or material specification, and the coating application areas.

Step 200

The user then enters industry or World Class $C_{pk}$ values. Available from their Internal Quality Departments. This data interacts with a set of rules within the program that tie this data with the corresponding coating range values.

Step 300

The user enters the following data into the computer system from the history database: Actual Surface Film Build Average, Actual Surface Film Build Range Average, Actual Surface Film Build $C_{pk}$ and Actual Surface Film Build Subgroup Size.

Step 400

The user selects different range values for the Material and Cost $C_{pk}$ Impact Analysis. The range values are obtained from analyzing a sample size of twenty units. Values are referenced from a Range Chart on either an X-Bar and R-Chart or an Individual and Moving Range Chart. Optimum range values (a minimum of two) are identified as obvious nonrandom patterns.

An algorithm calculates the Impact Analysis with the aforementioned two items as well as by process variability adjustment and average variability adjustment.

Example of Calculations Used in Impact Analysis Premises

Refer to Appendix F.

Subgroup Size of Surface Measurement: 14

Constants for this Subgroup Size: A2=0.235, d2=3.407

$A_2$ is a Factor for $\overline{X}$ Chart Limits. It is a matter of $\overline{R}$ used to calculate the control limits for averages.

$d_2$ is a Factor for estimating Process Standard Deviation.

Coating Process Data:

Coating Lower Specification Limit (LSL)=0.90 Mils, Actual $C_{pk}$=0.587, Industry and/or World Class $C_{pk}$=1.5

Upper Control Limit (UCL)=1.4098

Coating Film Build Mean ($\overline{X}$)=1.25, Coating Range Mean ($\overline{R}$)=0.68

Formulas $$UCLx=\overline{X}+(A2\times\overline{R}), \sigma=\overline{R}/d_2, C_{pk}=(\overline{X}-LSL)/3\sigma$$

$1^{st}$ Premise: Choose Optimum Range from Process Charts

Intent is to achieve the industry and/or world class standard of a $C_{pk}$=1.5

For an example, a range average of 0.20 is selected.

$\sigma=\overline{R}/d_2 \Rightarrow 0.2/3.407 \Rightarrow \sigma=0.0587$ $3\sigma=(3)(0.0587)=0.1761$ $C_{pk}=(x-LSL)/3\sigma \; 1.5=(x-0.9)/0.1761$ Result of Analysis:

$\overline{X}$=1.164, this represents a new coating average, which is less than the current process average of 1.25 by 6.87%. Decrease in coating usage would occur, if new variability could be achieved.

$2^{nd}$ Premise: Choose Optimum Range from Coatings Applicators' Manufacturer Guidelines. In this example, the manufacturer claimed a coating range of 0.50, the following data will show that to achieve the industry standard of a $C_{pk}$ of 1.5, the coating average will still have to be elevated at current process levels.

For an example, a range average of 0.20 is selected.

$\sigma=\overline{R}/d_2 \Rightarrow 0.5/3.407 \Rightarrow \sigma=0.147$ $3\sigma=(3)(0.0587)=0.441$ $C_{pk}=(\overline{X}x-LSL)/3\sigma \; 1.5=(x-0.9)/0.441$ Result of Analysis:

$\overline{X}$=1.56, this represents a new coating average, which is more than the current process average of 1.25 by 24.83%. Increase in coating usage would occur, applicator process variability is not sufficient by itself to take the process to the industry standard of a $C_{pk}$ of 1.5.

Example of Calculations Used in Impact Analysis Premises $3^{rd}$ Premise: Average Remains Constant, Variability Adjusted to World Class Standard Intent is to achieve the industry and/or world class standard of a $C_{pk}$=1.5

$UCLx=\overline{X}+(A2\times\overline{R})$ $1.3123=1.25+(0.235\times\overline{R}) \Rightarrow 0.0623=(0.235\times\overline{R}) \Rightarrow 0.265=\overline{R}$ $C_{pk}=(\overline{X}-LSL)/3\sigma \Rightarrow 1.5=(1.25-0.9)/3\sigma$ $\sigma=\overline{R}/d_2 \Rightarrow 0.265/3.407=0.07778$ $(3)(\sigma)=0.23334$ Result of Analysis:

This would result in a shift in the variability, however the coating average would remain the same. Facility would not experience any decrease in coatings usage.

$4^{th}$ Premise: Coating Usage Increases, Process Variability Remains Constant. Intent is to achieve the industry and/or world class standard of a $C_{pk}$=1.5

Coating Range Mean ($\overline{R}$)=0.68

$\sigma=\overline{R}/d_2 \Rightarrow 0.68/3.407 \Rightarrow \sigma=0.1995$ $(3)(\sigma)=0.5985$ $C_{pk}=(\overline{X}-LSL)/3\sigma \Rightarrow 1.5=(\overline{X}-0.9)/0.5985 \Rightarrow 0.898=(x-0.9) \Rightarrow x=1.798$ Result of Analysis:

Coating Film Build Average shifted substantially upward by 43.85%

---

Example of $C_{pk}$ Increases Due to Reducing the Film Build Range

The following reference data is used:

| | |
|---|---|
| Panel measured: | Hood |
| Film Build: | Average ($\overline{X}$) = 0.88   Range ($\overline{R}$) = 0.647 |
| Subgroup Size: | n = 24   $A_2$ = 0.157   $d_2$ = 3.895 |
| Minimum Spec. (LSL): | 0.60 Mil |
| Sigma formula: | $\sigma = \overline{R}/d_2$ |
| $C_{pk}$ formula: | $(\overline{X} - LSL)/3\sigma$ |

-continued

Example of $C_{pk}$ Increases Due to Reducing the Film Build Range

Example: Reducing the Film Build Range
A) Initial range used: 0.647 Mils
   Additional ranges used: 0.50 Mils, 0.25 Mils, and 0.10 Mils
B) Sigma is calculated for each range: $\sigma = \bar{R}/d_2$

| 1st Range: 0.647 Mils | 2nd Range: 0.50 Mils | 3rd Range: 0.25 Mils | 4th Range: 0.10 Mils |
|---|---|---|---|
| $\sigma = 0.637/3.895$ | $\sigma = 0.50/3.895$ | $\sigma = 0.25/3.895$ | $\sigma = 0.10/3.895$ |
| $\sigma = 0.166$ | $\sigma = 0.128$ | $\sigma = 0.064$ | $\sigma = 0.0257$ |

C) Calculate $3\sigma$ for each range

| 1st Range: 0.647 Mils | 2nd Range: 0.50 Mils | 3rd Range: 0.25 Mils | 4th Range: 0.10 Mils |
|---|---|---|---|
| $3\sigma = (3)(0.166)$ | $3\sigma = (3)(0.128)$ | $3\sigma = (3)(0.064)$ | $3\sigma = (3)(0.0257)$ |
| $3\sigma = 0.498$ | $\sigma = 0.384$ | $3\Sigma = 0.192$ | $3\sigma = 0.0771$ |

D) $C_{pk}$ is calculated with the different ranges in Film Build:
$$(\bar{X} - LSL)/3\sigma$$

| 1st Range: 0.647 Mils | 2nd Range: 0.50 Mils | 3rd Range: 025 Mils | 4th Range: 0.10 Mils |
|---|---|---|---|
| $C_{pk} = (0.88 - 0.6)/0.498$ | $C_{pk} = (0.88 - 0.6)/0.384$ | $C_{pk} = (0.88 - 0.6)/0.192$ | $C_{pk} = (0.88 - 0.6)/0.0771$ |
| $C_{pk} = 0.562$ | $C_{pk} = 0.729$ | $C_{pk} = 1.458$ | $C_{pk} = 3.63$ |

---

Example of $C_{pk}$ Increases Due to Increasing the Film Build Average

Example: Increase Film Build Average by 0.10 Mils
A) Sigma ($\sigma$) is calculated: $\sigma = \bar{R}/d_2$
   $0.166 = 0.647/3.895$
B) 3 Sigma ($3\sigma$) is calculated:
   $(3)(0.166) = 0.498$
C) $C_{pk}$ is calculated with Film Build increasing by 0.10 Mils:
$$(\bar{X} - LSL)/3\sigma$$

| 1st Film Build: 0.88 Mils | 2nd Film Build: 0.98 Mils | 3rd Film Build: 1.08 Mils |
|---|---|---|
| $C_{pk} = (0.88 - 0.6)/0.498$ | $C_{pk} = (0.98 - 0.6)/0.498$ | $C_{pk} = (1.08 - 0.6)/0.498$ |
| $C_{pk} = 0.562$ | $C_{pk} = 0.763$ | $C_{pk} = 0.964$ |
| 4th Film Build: 1.18 Mils | 5th Film Build: 1.28 Mils | 6th Film Build: 1.38 Mils |
| $C_{pk} = (1.18 - 0.6)/0.498$ | $C_{pk} = (1.28 - 0.6)/0.498$ | $C_{pk} = (1.38 - 0.6)/0.498$ |
| $C_{pk} = 1.16$ | $C_{pk} = 1.37$ | $C_{pk} = 1.56$ |

---

Cost Example

The following cost reference data is used:

| | |
|---|---|
| Annualized Production (units): | 200,000 |
| Coating: | Black Prime |
| Point: | #22, Center of Hood |
| Minimum Unilateral Spec: | 0.9 |
| Usage per Unit (gals/unit): | 0.30 |
| Originating Booth: | Prime |
| Coating Popularity (%): | 25 |
| Point (%): | 1.5** |
| Cost Per Gallon ($): | 24.00 |
| Booth Percent Flow (%): | 100*** |

*Point Subgroup Size = 2
**Percent Point refers to approximate area of paint required per point in regards to the total unit painted
***Booth % Flow refers to approximate production flow of units through a designated booth
The following coating reference data is used:

| | |
|---|---|
| Coating Average Film Build (mils): | 1.57 |
| Selected Coating Range (mils): | 0.21 |
| Actual $C_{pk}$: | 1.17 |

Example 1: Selected variation: 0.1
The following coating reference data is obtained:

| | |
|---|---|
| Coating Average Film Build (mils): | 1.30 |
| Selected Coating Range (mils): | 0.10 |
| World Class $C_{pk}$: | 1.500 |

-continued

Cost Example

EFFECT ON PAINT USAGE**:
**Percentage obtained from the following calculation:

Old coating average at a $C_{pk}$ of 1.170 = 1.57 mils
New coating average at a $C_{pk}$ of 1.500 = 1.30 mils
Effect on paint usage = ((New Average − Old Average)/ Old Average) × 100
−17.19% = ((1.30 − 1.57)/1.57) × 100
Approximate Annualized Cost Change Algorithm:

(Cost/gal.) × (Usage/Unit) × (Annual. Prod. Flow) × (Booth %) × (Color Pop.) × (Point %) × (Paint Change %)
(24.00) × (0.30) × (200,000) × (1.00) × (0.25) × (0.015) × (−0.1719)
Approximate Annualized Cost Change:       −$928.26

Example 2: New Average Millage with current variation
The following coating reference data is obtained:

| | |
|---|---|
| Coating Average Film Build (mils): | 1.737 |
| Coating Range (mils): | 0.21 |
| Actual $C_{pk}$: | 1.500 |

EFFECT ON PAINT USAGE**:
**Percentage obtained from the following calculation:

Old Coating average at a $C_{pk}$ of 1.170 = 1.57 mils
New coating average at a $C_{pk}$ of 1.500 = 1.737 mils
Effect on paint usage = ((New Average − Old Average)/ Old Average) × 100
10.64% = ((1.737 − 1.57)/1.57) × 100

-continued

Cost Example

Approximate Annualized Cost Change Algorithm:

(Cost/gal.) × (Usage/Unit) × (Annual. Prod. Flow) × (Booth %) ×
(Color Pop.) × (Point %) × (Paint Change %)
(24.00) × (0.30) × (200,000) × (1.00) × (0.25) × (0.015) × (0.1064)
Approximate Annualized Cost Change: $574.56

Best Example

Cost Example

Referring to Appendix D for reference information.
Given the following reference data:

| | |
|---|---|
| Annualized Production (units): | 200,000 |
| Coating: | Taupe Prime |
| Point: | #22, Center of Hood |
| Coating Minimum Specification: | 0.9 |
| Usage Per Unit (gal.): | 0.27 |
| Originating Booth: | Prime |
| Coating Popularity: | 25 |
| Point (%): | 1.05 |
| Cost Per Gallon ($): | 30.00 |
| Booth Percent Flow (%): | 100 |
| Coating Actual Average (Mils): | 1.47 |
| Coating Actual Range (Mils): | 0.21 |
| Actual $C_{pk}$: | 1.04 |
| Target Range Selected from Data (Mils): | 0.02 |
| World Class $C_{pk}$: | 1.5 |
| $E_2 = 2.66$ | $E_2$ is Factor for Control Limits |
| $d_2 = 1.128$ | $d_2$ is Factor for estimating Process Standard Deviation |
| Formulas: | |
| $UCL_x = \overline{X} + (E_2 \cdot R)$, $\sigma = \overline{R}/d_2$, $C_{pk} = (\overline{X} - LSL)/3\sigma$ | |

The target range of 0.02 mils was selected from the Process Data.

$\sigma = \overline{R}/d_2 \Rightarrow 0.02/1.128$  $\sigma = 0.01773$  $3\sigma = 3(0.08865) = 0.053$ $C_{pk} = (\overline{X} - LSL)/3\sigma \Rightarrow 1.15 = (\overline{X} - 0.90)/0.053 \Rightarrow \overline{X} = 0.9795$ $\overline{X} = 0.9795 \rightarrow$ This represents a new Coating Average, which is less than the actual Coating Average of 1.47.

Effect on Paint Usage
  Percentage obtained from the following calculation:
  Old Coating Average at a $C_{pk}$ of 1.04→1.47 mils
  New Coating Average at a $C_{pk}$ of 1.5 →0.9795 mils
    Effect on paint usage=((New Average−Old Average)/
      Old Average)×100(0.9795 mils−1.47 mils)/1.47
      mils×100−33.35%

Approximate Annualized Cost Change Algorithm:

(Cost/gal)×(Usage/Unit)×(Annual Prod. Flow)×
(Booth %)×(Color Population)×(Point %)×
(Paint Change %)

(30.00)×(0.27)×(200,000)×(1)×(0.25)×(0.0105)×(−0.3335)

Approximate Annualized Cost Change=($1,418.12)

$1,418.12 reduction represents 1.05% of Entire Unit

Entire Unit Equivalent to 100%, therefore:

$$\frac{\$1,418.12}{1.05\%} = \frac{\$ \text{ Total}}{100\%}$$

$1,418.12=(0.0105) Total Amount $135,059.05 savings if Total Unit Painted

APPENDIX A is an X-Bar and R Chart of an SPC chart used within the coating industry.

APPENDIX B is an Individual and Moving Range Chart of an SPC chart used within the coating industry.

APPENDIX C is a Schematic Profile containing statistical information used within the coating industry.

APPENDIX D is an example of the output of the novel invention entitled A Film Build $C_{pk}$'s Cost Impact Analysis Sheet.

APPENDIX E is a constants and formula page reference of formulas for $\overline{X}$ and R Charts and the Rule of Seven.

APPENDIX F is a second example of the output of the novel invention that is referenced in the Example of Calculations used in Impact Analysis Premises.

APPENDIX G is an example of the Cost Impact associated with three different conditions:
  1) Millage Adjustment, Variability Constant
  2) Range Variability Adjusted to 0.10 mils; and
  3) Range Variability Adjusted to 0.20 mils.

APPENDIX A
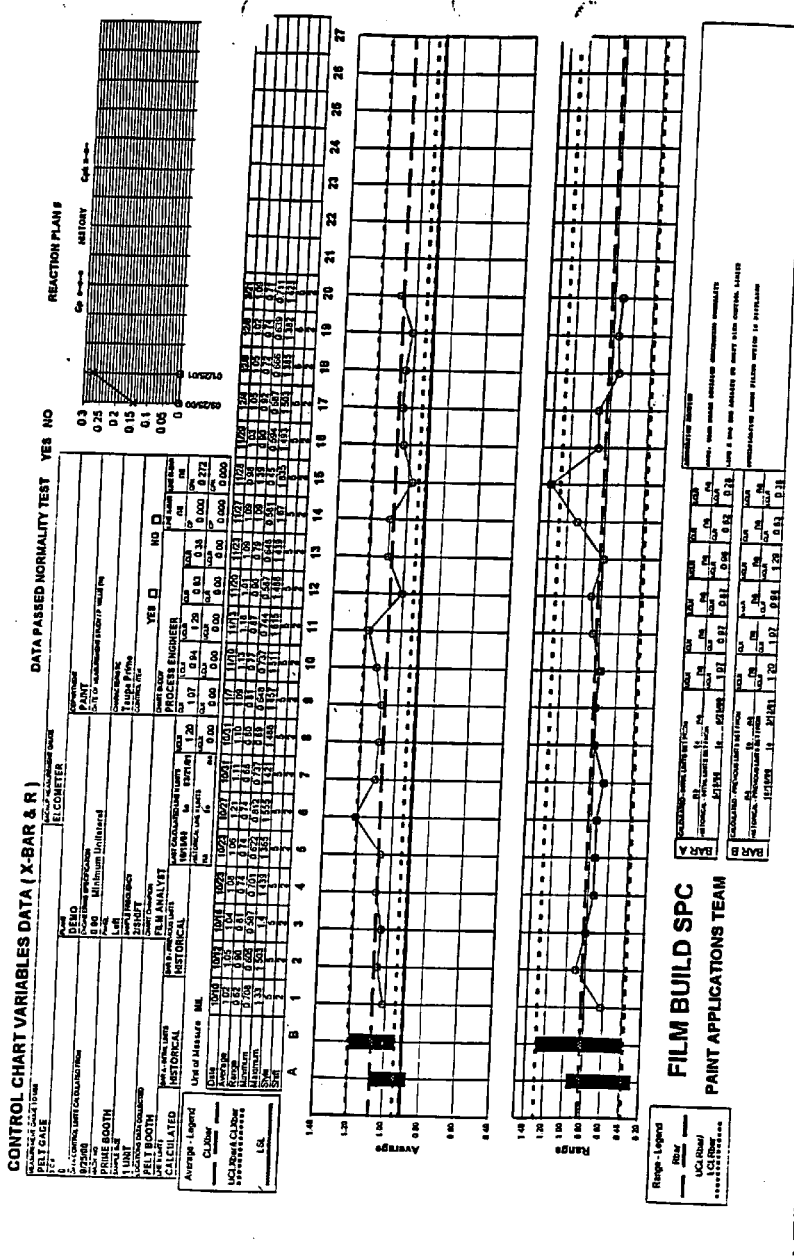

APPENDIX B
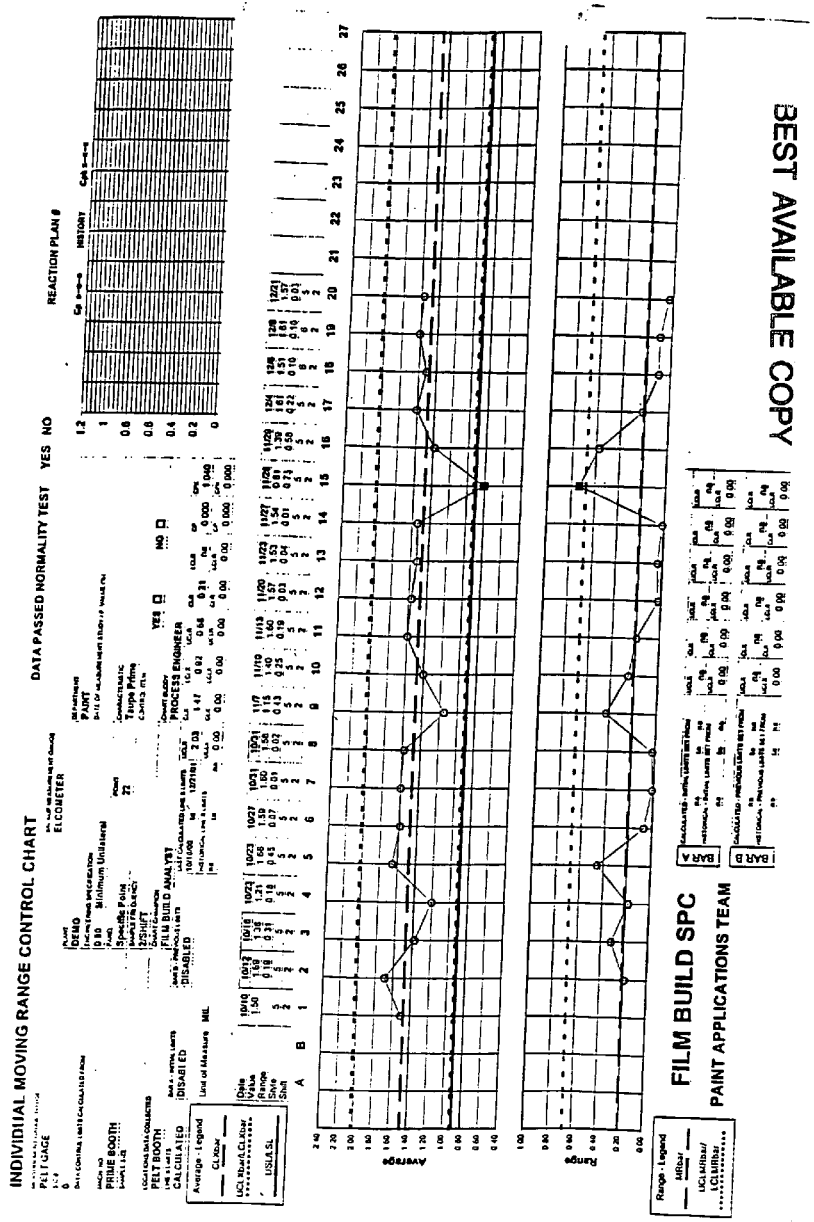

APPENDIX C
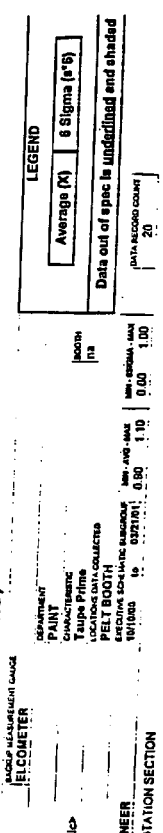
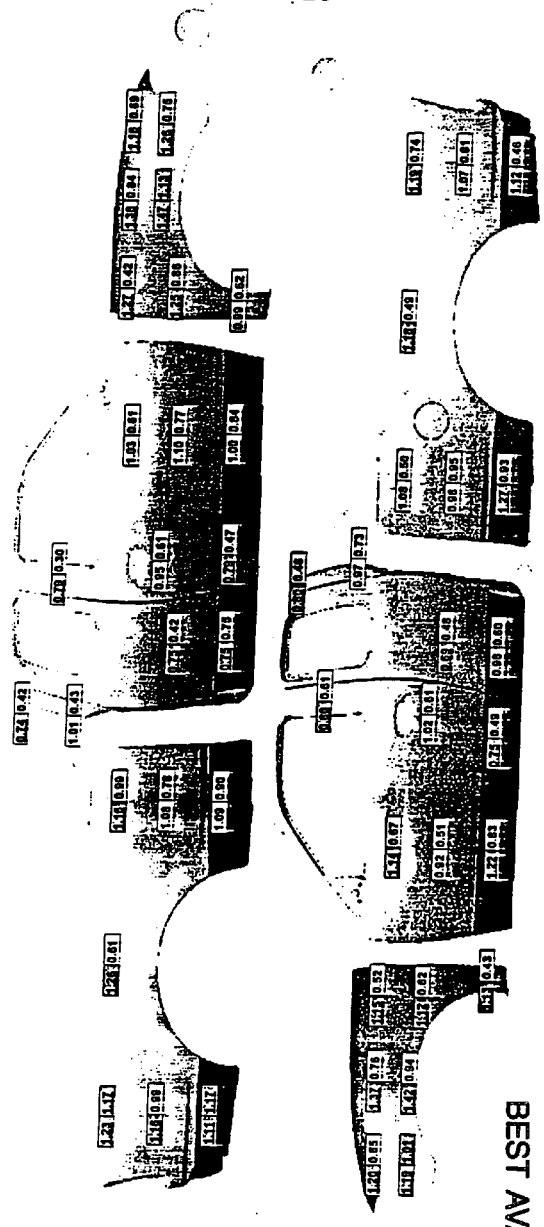

APPENDIX D
Film Build Cpk's Cost Impact Analysis
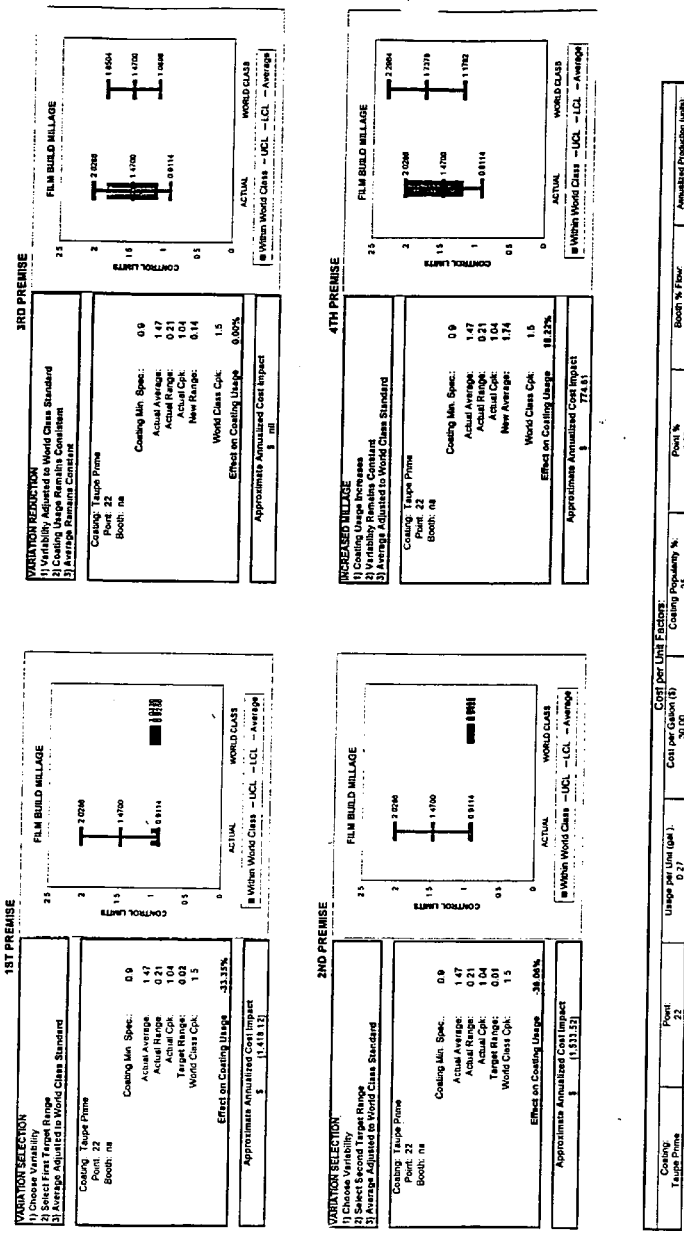

APPENDIX E

CONSTANTS AND FORMULAS

FORMULA FOR X̄ AND R CHARTS

X̄-Chart

$$\bar{X} = \frac{\Sigma x}{n}$$

$$CL\bar{X} = \bar{\bar{X}} = \frac{\Sigma \bar{x}}{k}$$

$$UCL\bar{X} = \bar{\bar{X}} + (A_2 \times \bar{R})$$

$$LCL\bar{X} = \bar{\bar{X}} - (A_2 \times \bar{R})$$

$$Cp = \frac{USL - LSL}{6\hat{\sigma}}$$

$$Cpk = \text{minimum of } \frac{USL - \bar{\bar{X}}}{3\hat{\sigma}} \text{ or } \frac{\bar{\bar{X}} - LSL}{3\hat{\sigma}}$$

R-Chart

$$CLR = \bar{R} = \frac{\Sigma R}{k}$$

$$UCLR = D_4 \times \bar{R}$$

$$LCLR = D_3 \times \bar{R}$$

$$\hat{\sigma} = \frac{\bar{R}}{d_2}$$

CONTROL CHARTS FOR VARIABLE DATA

- x — Individual Measurement
- $\bar{x}$ — Subgroup Average
- $\bar{\bar{x}}$ — Grand Average
- Σ — Sum of
- R — Range = Highest Value − Lowest Value
- CL — Center Line
- UCL — Upper Control Limit
- LCL — Lower Control Limit
- k — Number of Subgroups
- n — Subgroup Size
- $\hat{\sigma}$ — Process Standard Deviation
- $A_2$ — Factor for X̄ Chart Limits
- $D_4$ — Factor for UCL on R Chart
- $D_3$ — Factor for LCL on R Chart
- USL — Upper Specification Limit
- LSL — Lower Specification Limit
- $d_2$ — Factor for estimating Process Standard Deviation

| | Chart X̄ | Range Chart R | | | |
|---|---|---|---|---|---|
| n Subgroup Size | A2 Upper and Lower Control Limit Factor | d2 Estimate of Standard Deviation Divisor | D3 Lower Control Limit Factor | D4 Upper Control Limit Factor |
| 2 | 1.880 | 1.128 | na | 3.270 |
| 3 | 1.023 | 1.693 | na | 2.574 |
| 4 | 0.729 | 2.059 | na | 2.282 |
| 5 | 0.577 | 2.326 | na | 2.114 |
| 6 | 0.483 | 2.534 | na | 2.004 |
| 7 | 0.419 | 2.704 | 0.076 | 1.924 |
| 8 | 0.373 | 2.847 | 0.136 | 1.864 |
| 9 | 0.337 | 2.970 | 0.184 | 1.816 |
| 10 | 0.308 | 3.078 | 0.223 | 1.777 |
| 11 | 0.285 | 3.173 | 0.256 | 1.744 |
| 12 | 0.266 | 3.258 | 0.283 | 1.717 |
| 13 | 0.249 | 3.336 | 0.307 | 1.693 |
| 14 | 0.235 | 3.407 | 0.328 | 1.672 |
| 15 | 0.223 | 3.472 | 0.347 | 1.653 |
| 16 | 0.212 | 3.532 | 0.363 | 1.637 |
| 17 | 0.203 | 3.588 | 0.378 | 1.622 |
| 18 | 0.194 | 3.640 | 0.391 | 1.608 |
| 19 | 0.187 | 3.689 | 0.403 | 1.597 |
| 20 | 0.180 | 3.735 | 0.415 | 1.585 |
| 21 | 0.173 | 3.778 | 0.425 | 1.575 |
| 22 | 0.167 | 3.819 | 0.434 | 1.566 |
| 23 | 0.162 | 3.858 | 0.443 | 1.557 |
| 24 | 0.157 | 3.895 | 0.451 | 1.548 |
| 25 | 0.153 | 3.931 | 0.459 | 1.541 |

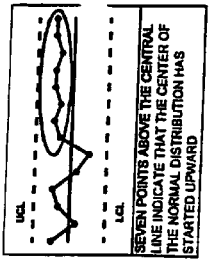

A POINT OUTSIDE OR DIRECTLY ON THE CONTROL LINE

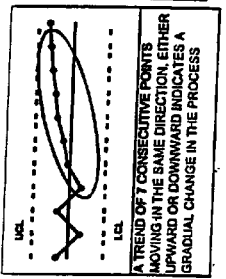

A TREND OF 7 CONSECUTIVE POINTS MOVING IN THE SAME DIRECTION, EITHER UPWARD OR DOWNWARD INDICATES A GRADUAL CHANGE IN THE PROCESS

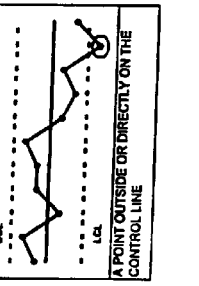

SEVEN POINTS ABOVE THE CENTRAL LINE INDICATE THAT THE CENTER OF THE NORMAL DISTRIBUTION HAS STARTED UPWARD

BEST AVAILABLE COPY

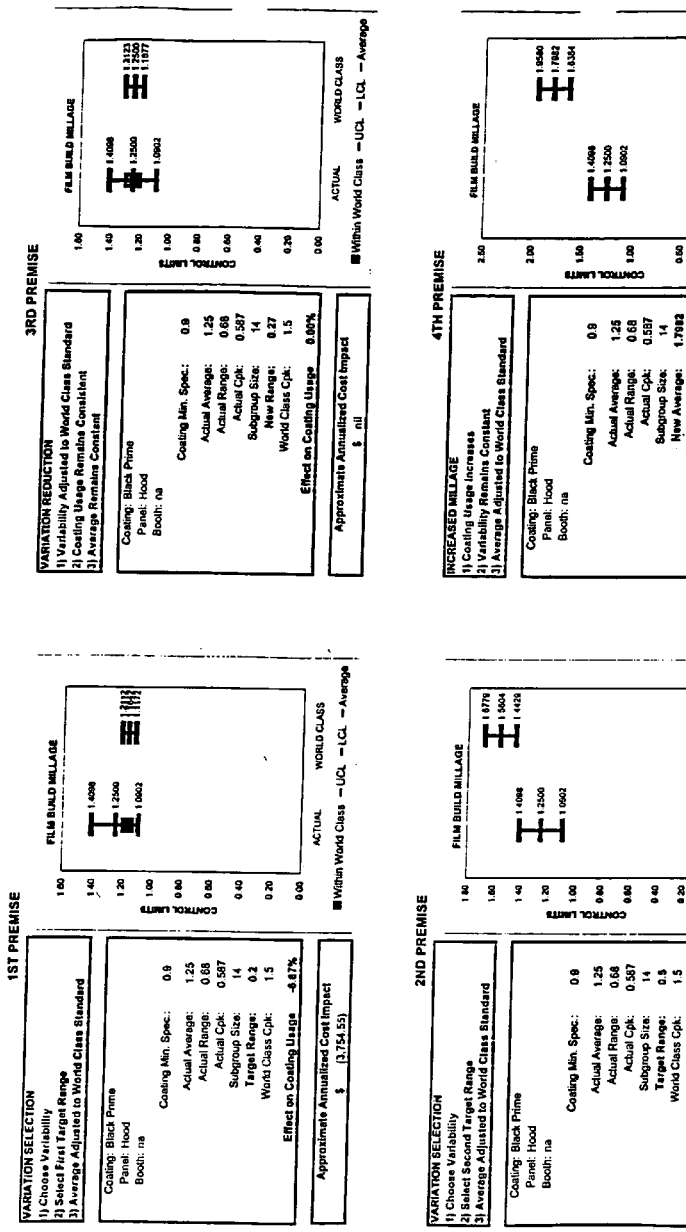

APPENDIX G

Variability Reduction Tools

Automotive Facility
Booth 2 Clear Coat Film Build Cost Analysis

| Panel | Millage Adjusted, Variability Constant | Range Variability Adjusted: 0.10 Mils | Range Variability Adjusted: 0.20 Mils |
|---|---|---|---|
| Left | $ 214,576 | $ 7,333 | $ 25,674 |
| Right | $ 263,413 | $ 22,571 | $ 41,838 |
| Hood | $ 161,393 | ($ 39,670) | ($ 23,712) |
| Roof | $ 84,819 | ($ 19,053) | ($ 505) |
| Deck | $ 40,453 | ($ 20,413) | ($ 10,903) |
| Totals: | $ 764,654 | ($ 49,232) | $ 32,392 |

I claim:

1. A method for monitoring the film build thickness of workpieces on which a first film build process has been performed, comprising the steps of:
   calculating a first $C_{pk}$ of workpieces on which a first film build process has been performed;
   acquiring data relating to parameters of a second film build process in which at least one of the parameters of the first film build process has been changed;
   calculating a second $C_{pk}$ of the second film build process from said acquired data; and
   calculating the difference between the first $C_{pk}$ and the second $C_{pk}$ to ascertain the relationship between said difference and the changed parameter.

2. A method as defined in claim 1, including the step of acquiring cost data relating to said first film build process and cost data relating to said second film build process; and
   generating a cost difference utilizing the first film build process and the second film build process utilizing the first $C_{pk}$ and the second $C_{pk}$.

3. A method as defined in claim 1, including the step of calculating the $C_{pk}$ of at least one of said film build processes from range values of the film build thickness of the corresponding film build process.

4. A method as defined in claim 1, including the step of acquiring selected coating millages relating to said first film build process and selected coated millages relating to said second film build process; and
   generating a cost difference between the first film build process and the second film build process utilizing the first Cpk and the second Cpk to ascertain the mean shift in Film Build millages.

5. A method as defined in claim 1, including the step of acquiring target range values relating to said first film build process and target-range values relating to said second film build process; and
   generating a cost difference between the first film build process and the second film build process utilizing the first $C_{pk}$ and the second $C_{pk}$.

6. A method as defined in claim 1, including the step of acquiring data of the cost difference between the first and the second film build processes in which both of said film build processes have the same film thickness averages but with a different $C_{pk}$ for the first and the second film build processes.

7. A method as defined in claim 1, including the step of acquiring data of the first film build process including Coating Minimum Specifications, Actual Film Thickness Average, Actual Film Thickness Range, the $C_{pk}$ of the first film process, and a subgroup size.

8. A method as defined in claim 7, including the step of selecting target range values for the first film process and the second film process, and then calculating the differences in the film build material usage from the difference between the first $C_{pk}$ value and the second value $C_{pk}$.

9. A method as defined in claim 1, including the step of acquiring data regarding film build usage, of the first film build process and film build usage data of the second film build process, and in which the changed parameter is the film build material usage of said first film process, and then calculating the difference in film build material usage from the difference in the first $C_{pk}$ value and the second $C_{pk}$ value.

10. A method as defined in claim 1, in which the changed parameter is the process control limits of the second film build process and then calculating the change in film build material usage from the difference in the first $C_{pk}$ value and the second $C_{pk}$ value.

11. A method as defined in claim 1, including the step of acquiring data of the film build material usage of the first film build process, then selecting coating millages for at least one of said film build processes, and then calculating the change in film build material usage from the difference between said first $C_{pk}$ value and the second $C_{pk}$ value.

12. A method as defined in claim 1, including the step of acquiring data regarding the material usage values of the first film build process and the film usage of the second film build process based on using the same film thickness with different variability for the first and the second film build processes and then calculating the change in film build usage from the difference between said first $C_{pk}$ value and the second $C_{pk}$ value.

13. A method as defined in claim 1, including the step of calculating the optimal variability of the first film build process by adjusting the film millage average thereof, using said first $C_{pk}$ and in which optimal variability is defined as the lowest standard deviation in a run of seven or more units in the film build process.

14. A method as defined in claim 1, including the step of calculating the optimal variability of said first film build process by adjusting the film millage costs thereof utilizing said first $C_{pk}$ and in which optimal variability is defined as the lowest standard deviation in a run of seven or more units in the build process.

15. A method as defined in claim 1, including the step of adjusting the variability of the first film build process to optimize the film millage average.

16. Apparatus for monitoring the film build thickness of workpieces on which a first film build process has been performed, comprising:
   computer-implemented means for calculating a first $C_{pk}$ of the workpieces on which the first film build process has been performed;
   means for acquiring data relating to parameters of a second film build process in which at least one of the parameters thereof has been changed;
   computer-implemented means for calculating a second $C_{pk}$ of the second film build process; and
   computer-implemented means for calculating the difference between the first $C_{pk}$ and the second $C_{pk}$ to develop a relationship between said difference and the changed parameter.

* * * * *